United States Patent [19]

Saurer et al.

[11] 4,277,144
[45] Jul. 7, 1981

[54] ELECTRO-OPTIC PASSIVE DISPLAY CELL

[75] Inventors: Eric Saurer, Bevaix; Fereydoun Gharadjedaghi, Neuchatel; Claude Laesser, La Chaux-de-fonds; Rene Viennet, Neuchatel; Yves Ruedin, Saint-Blaise, all of Switzerland

[73] Assignee: Ebauches S.A., Neuchatel, Switzerland

[21] Appl. No.: 22,199

[22] Filed: Mar. 20, 1979

[30] Foreign Application Priority Data

Mar. 22, 1978 [CH] Switzerland .......................... 3135/78

[51] Int. Cl.³ .............................................. G02F 1/13
[52] U.S. Cl. ..................................... 350/349; 350/340
[58] Field of Search ................ 350/340, 341, 349, 331

[56] References Cited

U.S. PATENT DOCUMENTS

| 3,833,287 | 9/1974 | Taylor et al. ................ 340/349 |
| 3,865,469 | 2/1975 | Asai et al. .................... 350/349 |
| 4,112,157 | 9/1978 | Krueger et al. .............. 340/340 |

*Primary Examiner*—Bruce C. Anderson
*Attorney, Agent, or Firm*—Silverman, Cass & Singer, Ltd.

[57] ABSTRACT

Electro-optic passive display cell constituted by a layer of a mixture of a nematic liquid crystal having a positive dielectric anisotropy, an optically active compound and dichroic molecules. The inner faces of the plates the cell are covered with alignment layers such that, in the area situated outside the display zones or segments, the layer of the mixture has a homeotropic structure in its whole thickness. Opposite the segments the cell is arranged in such a way that the layer of the mixture has a helicoidal structure so that incident light is absorbed in these zones when the segments are not activated and that the layer of the mixture is orientated according to a homeotropic structure under the action of an electric field. Thus, when the cell is at rest, all its segments are visible. The display is effected by "cancelling" or "effacing" the segments which must not appear, so that only the non activated segments remaining visible in dark on a clear or transparent background.

5 Claims, 3 Drawing Figures

ELECTRO-OPTIC PASSIVE DISPLAY CELL

BACKGROUND OF THE INVENTION

The present invention relates to an electro-optic passive display cell comprising two plates at least one of which, i.e. the front one, is transparent, and between which is imprisoned a layer of a mixture comprising among others a nematic liquid crystal.

The display cells having a liquid crystal of the twisted nematic type are generally thus realized, the two plates being transparent. Unfortunately, they need the presence of polarizers.

One has suggested to add dichroic molecules to the liquid crystal. This type of cells is disclosed in the publication of G. H. Heilmeier et al., Molecular Crystals and Liquid Crystals, 1969, Vol. 8, pp 293-304. If the liquid crystal has a positive dielectric anisotropy, the alignment being homogeneous planar on the two plates, the display appears in clear on a dark background, which is not favorable from the physiological point of view. A display in dark on a clear background can be obtained by using a liquid crystal having a negative dielectric anisotropy, the alignment being homeotropic on the two plates. For this type of liquid crystal, the absolute value of the dielectric anisotropy $|\Delta\epsilon|$ is substantially lower than for the liquid crystals having a positive dielectric anisotropy which are generally used. Therefore, the control voltage is higher. One can place a polarizer in front of the cell to increase the contrast, but that diminishes the brilliancy of the background.

The solution disclosed by Taylor et al. in U.S. Pat. No. 3,833,287 realizes a cell having a good contrast and a high brilliancy without a polarizer. In this case, the display appears always in clear on a dark background. This solution is based on the fact that while adding an optically active compound to the liquid crystal, one induces a helicoidal structure the pitch p of which is a function of the concentration of the optically active component in the mixture, so that the dichroic molecules associated to the mixture absorb all the components of the light.

The purpose of the invention is to furnish a electro-optic passive display cell in which the display is effected in dark on a clear or transparent background while using a mixture of a liquid crystal having a positive dielectric anisotropy, an optically active component and dichroic molecules, such as is disclosed in the referenced U.S. Pat. No. 3,833,287.

The structure of the layer of the mixture is determined both by the type of alignment of the molecules on the surfaces of the plates and by the thickness of the said layer. If this thickness is sufficiently important, the structure is always helicoidal in the mass of the mixture, independently of the type of alignment on the surfaces.

For or in the presence of homeotropic alignment on each of the two plates, there exists a critical thickness of the layer, which depends on the pitch p of the helix and on the elastic constants of the mixture; under or less than this thickness the structure of the said layer is homeotropic in or through its whole thickness. This critical value is given by the formula:

$$L_{c\perp} = p \cdot \frac{k_{33}}{2k_{22}}$$

where $L_{c\perp}$: critical thickness of the layer p: pitch of the helicoidal structure of the mixture without stress $k_{22}$: elastic constant for a deformation of torsion of the mixture $k_{33}$: elastic constant for a deformation of flexion of the mixture.

This formula is drawn from an article of "Applied Physics Letters", Vol. 25, No 1, July 1, 1974, W. Greubel, pp. 5 to 7.

Thus, for a cell the alignment of which is homeotropic on the two faces and in which the thickness of the layer is lower or less than the critical value, the molecules are aligned perpendicularly to the plates in or through the whole thickness of the cell. On the other hand, for a cell in which the thickness of the layer is higher or greater than the critical value, the molecules are well aligned perpendicularly to the plates in the vicinity of the plates, but, in a median portion, the helicoidal structure will appear.

SUMMARY OF THE INVENTION

The principle on which the invention is based lies in the fact that, in the area situated outside the display zones or segments, the conditions realizing a homeotropic structure through the whole thickness of the cell are found (homeotropic) alignment layer on the two plates and $$L \leq p \cdot \frac{k_{33}}{2k_{22}})$$

while these conditions are not realized in the display zones (alignment layer other than homeotropic on at least one plate and/or $$L > p \frac{k_{33}}{2k_{22}}).$$

Hence, in the area situated outside the display zones, the structure being homeotropic through the whole thickness of the layer of the mixture, the light is not absorbed. Consequently, this area is transparent and, therefore, of the same color as the background. On the other hand, in the display zones, the helicoidal structure is maintained when these zones are not subjected to the action of an electric field and, consequently, absorbs the incident light, the behavior being similar to that disclosed by Taylor et al. in the U.S. Pat. No. 3,833,287. When an electric field is applied in the area of the display zones, the helicoidal structure is broken and the molecules of the mixture then orient themselves according to a homeotropic structure. In these activated zones, the light is consequently no longer absorbed so that these zones are then confounded indiscriminate with the background. Hence, only the display zones which are not activated remain dark, being visible in dark on a clear background. The control of this type of display is thus reversed with respect to the cells disclosed by Taylor et al. This reduces the average consumption of the cell by a factor of about two, in the case where all the digits of the cell are used for the display.

In order that the conditions conductive to a homeotropic alignment in the whole thickness of the layer of the mixture are not realized in the display zones, one can interrupt the alignment layer homeotropic opposite the display zones on one or on both of the two plates of the cell and/or increase the thickness of the layer of the mixture opposite the said display zones, for instance by providing recesses in one of the plates, of a thickness such that $$L > p\frac{k_{33}}{2k_{22}}$$

at these places.

BRIEF DESCRIPTION OF THE DRAWING

The drawing shows the prior art and represents, by way of example, two embodiments of the invention.

Figure 1:
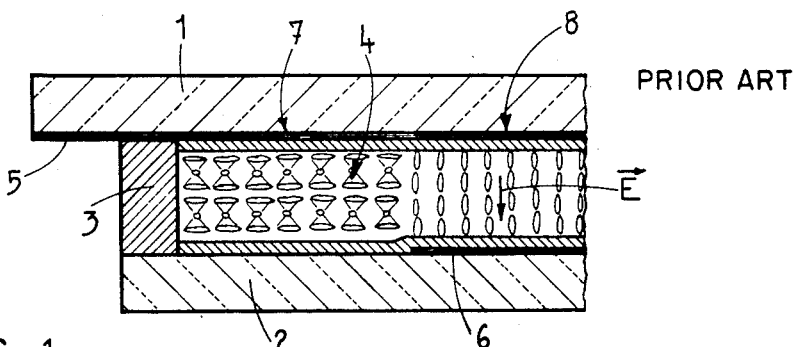
FIG. 1 is a sectional view of a portion of a known electro-optic display cell, such as disclosed in the U.S. Pat. No. 3,833,287.

It is to be noted that, in all these figures, the thicknesses of the elements represented have been exaggerated so as to increase the clearness of the drawing.

DESCRIPTION OF THE PREFERRED EMBODIMENT

The cell represented in FIG. 1, of the "White-Taylor" type, such as disclosed in the U.S. Pat. No. 3,833,287, comprises two glass plates 1 and 2 maintained at a distance from each other by a frame 3 to which they are assembled tightly, and which thus provides a room or space in which a mixture 4 is imprisoned. The plate 1 carries a control electrode 5 while the plate 2 carries a control electrode 6. The mixture 4 is constituted by a nematic liquid crystal, an optically active component and dichroic molecules. This mixture has a characteristic of having a helicoidal structure in the absence of an electric field (area 7) while, if such a field is applied thereto (area 8), as indicated by the vector $\vec{E}$, the mixture takes a homeotropic structure. Consequently, the display appears in clear on a dark background, which is not favorable. The same result could be obtained with a pure cholesteric liquid crystal, mixed with dichroic molecules, but would necessitate much higher control voltages.

Such a cell operates as well with a perpendicular alignment as with a parallel alignment of the molecules to the plates (homeotropic or planar alignment). In the case of a planar alignment on the two plates, one induces a structure called Grandjean, the axis of the helix being perpendicular to the plates, while, in the case of conditions to the homeotropic limits, one generally induces into the mass a structure called "with fingerprints" (see The Physics of Liquid Crystals, P. G. de Gennes, Clarendon Press-Oxford 1974, p. 262). One can still note that the voltage of commutation is lower for the structure with finger-prints than for the structure for Grandjean.

Figure 2:
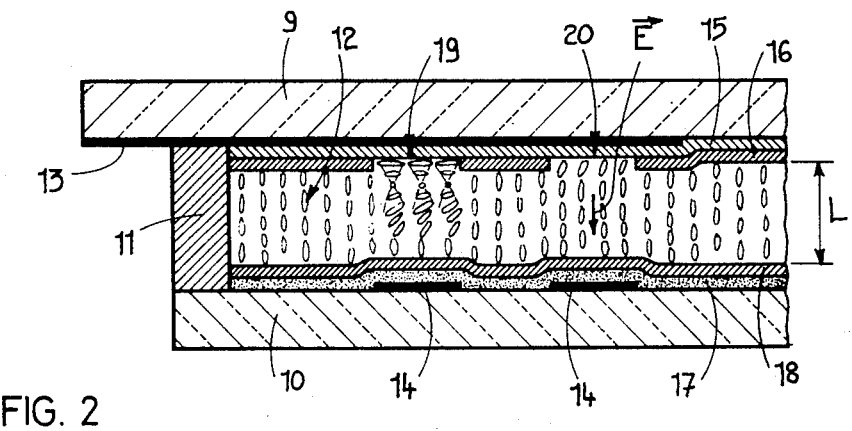
FIGS. 2 and 3 are sectional views, at a larger scale, of two embodiments of electro-optic display cells according to the invention.

What has been said can apply to the embodiment of the invention such as represented in FIG. 2, but in the display zones or segments of this embodiment only.

This cell comprises two plates 9 and 10 at least one of which, i.e. the front plate 9, is transparent, and which are separated from each other by a frame 11 to which they are assembled tightly, thus providing a room or space filled with a mixture 12 constituted by a nematic liquid crystal having a positive dielectric anisotropy, an optically active compound and dichroic molecules.

The front plate 9 carries a transparent control electrode 13, made of $SnO_2$ for instance, while the rear plate 10 carries control electrodes 14, also made of $SnO_2$. The plate 9 is moreover innerly coated with a layer 15 of $SiO_2$ playing at the same time the role of a locking layer of the continuous component of the control signal and of a substantially planar alignment layer, the angle of inclination of the molecules being lower or less than 45°. This layer 15 of $SiO_2$ is itself coated with a homeotropic alignment layer 16, made of $Al_2O_3$ for instance. The latter is interrupted opposite the display zones, that is to say opposite the electrodes 14 of the plate 10. The electrodes 14 are innerly coated with a diffusing layer 17, which is itself covered with a homeotropic alignment layer 18 of $Al_2O_3$.

The thickness L of the layer of the mixture of the whole cell is lower than the critical thickness $L_{cl}$.

The cell such as diclosed operates as follows:

In the area situated outside the display zones, the homeotropic alignment layers 16 and 18 have an effect such that the molecules of the mixture have a homeotropic structure in the whole thickness of the cell. Hence, in this area the incident light is not absorbed and consequently, this area has the appearance and especially the color of the diffusing layer 17 constituting the background.

In the display zones or segments, the molecules of the mixture are in contact, on the side of the plate 9, not with the homeotropic alignment layer 16, but with the layer 15 of $SiO_2$. Hence, in the non-activated display zones, such as zone 19, the molecules of the mixture are orientated in a direction parallel to the plate 9 in the vicinity of the plate 9. On the other hand, on the side of the plate 10, the mixture being in contact with the homeotropic alignment layer 18, its molecules are aligned perpendicularly to this plate in the vicinity of the plate 10. Therefore, the helocoidal structure is maintained in the non-activated display zones, such as the zone 19, which thus absorb the incident light and appear in dark on a clear background.

When the display zones are subjected to the action of an electric field, such as the field represented by the vector $\vec{E}$, as it is the case in the zone 20 of FIG. 2, the molecules are aligned in a parallel direction to the field, the structure then being homeotropic. The activated segments are thus "cancelled" or "effaced". Consequently, the control of this cell is reversed.

It is to be noted that the homeotropic alignment layer 18 covering the plate 10 could also be interrupted opposite the electrodes 14, as is the layer 16 of the plate 9, a layer of $SiO_2$ being interposed between the diffuser 17 and the homeotropic alignment layer 18. In this case, in the non-activated display zones, such as the zone 19 of FIG. 2, the molecules of the mixture, instead of having a planar alignment on one of the plates and a homeotropic alignment on the other one, would have a planar alignment on both of the two plates. One would be in the presence of a structure of Grandjean.

It is to be noted that the present arrangement eliminates the usual limits or constraints to which are submitted the determination of the topology of the electrodes. As a matter of fact, where the projection of the pattern of an electrode of the front plate on the rear plate crosses the pattern of an electrode of the rear plate, an electric field is created which tends to orientate the molecules of the mixture according to a homeotropic structure, which is precisely the structure of the mixture in the area situated outside the display zones. The crossing points do not risk, consequently, to be untimely visible. The realization of the pattern of the sets of electrodes carried by the two plates is therefore largely facilitated. Thus, one of the plates could be entirely covered with a conductive coating. This improvement can be considered as an important simplification.

It is to be noted that the layer 15 of $SiO_2$ can be suppressed if one uses $SnO_2$ for the realization of the conductive tracks, this $SnO_2$ material generally aligning the molecules along a planar structure.

Figure 3:
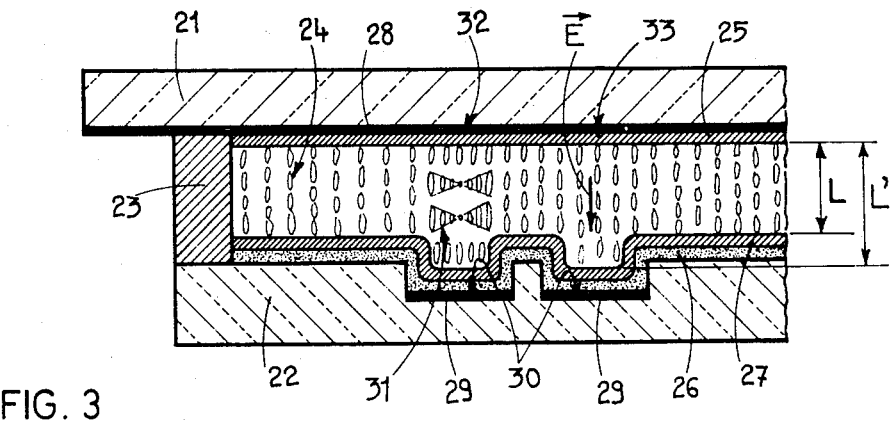

In the embodiment of FIG. 3, the cell represented comprises two glass plates 21 and 22, one of which, i.e. the front plate 21, is transparent, and which are separated by a frame 23 to which they are assembled tightly. A room or space is thus provided, in which there is located a mixture 24 constituted by a nematic liquid crystal having a positive dielectric aniostropy, an optically active component and dichroic molecules. The plate 21 is moreover innerly coated with a homeotropic alignment layer 25 of $Al_2O_3$ while the rear plate 22 is innerly coated with a diffusing layer 26 and with a homeotropic alignment layer 27 of $Al_2O_3$.

In the area situated outside the display zones, the thickness L of the layer of the mixture is lower than the critical value $L_{cl}$.

The front plate 21 carries a control electrode 28 while the rear plate 22 carries control electrodes 29. The latter are located within recesses 30 provided in the inner face of the plate 22, the shape of which corresponds to that of the display zones or segments. Owing to these recesses opposite the said display zones, the thickness L' of the layer of the mixture is higher than the critical value $L_{cl}$.

This cell operates as follows:

In the area situated outside the display zone, the homeotropic alignment layers 25 and 27 have an effect such that the layer of the mixture has a homeotropic structure in the whole thickness of the cell. Hence, in this area the incident light is not absorbed and consequently, this area has the appearance and especially the color, of the diffusing layer constituting the background.

In the display zones, due to the increase of the thickness of the layer of the mixture due to the presence of the recesses 30, the homeotropic structure hereinabove disclosed is replaced by a helicoidal structure, as indicated in 31, when no electric field is applied. The light is absorbed and, therefore, the non-activated segments appear in dark on a clear background.

If, on the contrary, an electric field such as represented by the vector $\vec{E}$ is applied to the display zones, as is the case in the area 33, the mixture 24 takes a homeotropic structure, so that the activated area is "cancelled" or "effaced", thus becoming clear, and it does no longer distinguish itself from the background.

One could also interrupt the homeotropic alignment layers opposite the display zones, as it is the case in the embodiment of FIG. 2. However, the absence of any interruption of the alignment layers has advantages concerning the simplicity of manufacturing, and a low voltage of commutation, permitted by the homeotropic alignment layers on the two plates.

It is to be noted that the remarks made with respect to the embodiment of FIG. 2 concerning the advantages relating to the pattern of the electrodes are also valid for the embodiment of FIG. 3.

In the two examples disclosed and represented, the mixture could contain 97.8% of a liquid crystal having a positive dielectric anisotropy such as E8 (of the British firm BDH), 1.2% of an optically active component such as CB 15 (of the british firm BDH) and 1% of a dyestuff such as D35 (also of the British firm BDH). For such a mixture, the pitch p of the helix is about 12 $\mu$m. As in this particular case $$\frac{k_{33}}{2k_{22}}$$

is substantially equal to 1, the critical value of L will also be equal to about 12 $\mu$m.

It must be understood that "planar" does not mean that the axes of the molecules are exactly parallel to the plane of the cell; likewise, homeotropic does not mean that these axes are exactly perpendicular to this plane. The parallelism and the perpendicularity are only limit cases.

One can also note that the alignment layers such as disclosed could be replaced by layers of other materials: a homeotropic alignment can be obtained not only with layers of $Al_2O_3$, but also with layers of $MgF_2$, for instance (see German Patent Application (DAS) No 23 30 909 of Siemens); a substantially planar alignment can be obtained not only with layers of $SiO_2$ or $SnO_2$, but also with layers obliquely deposited by evaporation of several materials according to the method disclosed by J. L. JANNING in the U.S. Pat. No. 3,834,792.

It is to be noted that one can provide, in the present device, permanent display zones, that is to say zones of the same construction as the display zones, but without control electrodes, which, consequently, will remain permanently contrasted to the background. Such zones, for instance, can constitute a frame surrounding the whole of the display zones.

It is to be noted that the present arrangement (as well that of FIG. 2 and that of FIG. 3) can easily be combined with the conventional arrangement in which the segments to be displayed must be activated. One can, as a matter of fact, imagine a display cell comprising, in the same space or enclosure, two display zones, one realized according to the present arrangement and the other of the "White-Taylor" type.

What we claim is:

1. An electro-optic display cell comprising:
   A. two plates arranged adjacent one another and providing a space therebetween, at least one of the plates being transparent and both plates having an inner surface arranged adjacent the other;
   B. electrodes carried on the inner surfaces of the plates to form display zones, in which display zones, electric fields may be created;
   C. a layer of a mixture of a nematic liquid crystal having a positive dielectric anisotropy, an optically active component and dichroic molecules, the mixture filling the space between the plates and having a median zone, the mixture having a critical thickness in the presence of a homeotropic alignment layer on each of the inner surfaces of the plates such that for a thickness of the mixture less than this critical thickness, the molecules of the mixture have a homeotropic structure through the whole structure of the mixture and for a thickness of the mixture greater than the critical thickness, the molecules of the mixture have a helicoidal structure in the median zone, and the mixture having a homeotropic structure in the presence of an electric field;

D. in the areas of the inner surface situated outside the display zones there is a homeotropic alignment layer on each of the inner surfaces of the plates and the thickness of the mixture is less than the critical thickness so that the molecules of the mixture have a homeotropic structure through the whole thickness of the mixture and the mixture is transparent; and E. in the display zones, in the absence of any electric field, the molecules of the mixture have a helicoidal structure and are absorbent, while in the presence of an electric field, the molecules of the mixture have a homeotropic structure and are transparent so that the non-activated display zones are dark on a transparent background.

2. The cell as claimed in claim 1 in which there is a substantially planer alignment layer on at least one of the plates in the display zones to form the helicoidal structure in the absence of any electric field, the angle formed between the mixture and the plate being less than 45 degrees.

3. The cell as claimed in claim 2 in which the homeotropic alignment layers are interrupted in the display zones on at least one of the plates of the cell to provide the helicoidal alignment in the display zones.

4. The cell as claimed in claim 1 in which the thickness of the mixture in the display zones is greater than the critical thickness to produce the helicoidal structure in the absence of any electric field.

5. The cell as claimed in claim 4 in which the homeotropic alignment layers cover the whole inner surfaces of the plates.

* * * * *